United States Patent
Hozuki

(10) Patent No.: US 7,393,307 B2
(45) Date of Patent: Jul. 1, 2008

(54) FUEL INJECTION CONTROL APPARATUS OF INTERNAL COMBUSTION ENGINE

(75) Inventor: Takashi Hozuki, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 89 days.

(21) Appl. No.: 11/221,861

(22) Filed: Sep. 9, 2005

(65) Prior Publication Data

US 2006/0258507 A1    Nov. 16, 2006

(30) Foreign Application Priority Data

May 11, 2005    (JP)    ............ P2005-138572

(51) Int. Cl.
*F16H 59/30*    (2006.01)
*B60T 7/12*    (2006.01)
*G05D 1/00*    (2006.01)
*G06F 7/00*    (2006.01)
*G06F 17/00*    (2006.01)

(52) U.S. Cl. ............... 477/121; 701/103

(58) Field of Classification Search ........... 477/121; 701/101–103
See application file for complete search history.

(56) References Cited

U.S. PATENT DOCUMENTS 5,625,558 A * 4/1997 Togai et al. .............. 701/93
6,205,874 B1 * 3/2001 Kupper et al. ........... 74/335
7,011,604 B2 * 3/2006 Watanabe et al. ........ 477/110
7,058,490 B2 * 6/2006 Kim ......................... 701/34

FOREIGN PATENT DOCUMENTS

| JP | 09-088652 | 3/1997 |
|---|---|---|
| JP | 2001-304400 A | 10/2001 |
| JP | 2004-100590 A | 4/2004 |

* cited by examiner

*Primary Examiner*—Tisha D Lewis
(74) *Attorney, Agent, or Firm*—Sughrue Mion, PLLC

(57) ABSTRACT

A fuel injection control apparatus of an internal combustion engine having reduced erroneous determination and delay of discriminating/updating a gear position and thus having improved accuracy of its gear position information. The apparatus has a gear position sensor for detecting a gear position; a vehicle speed pulse sensor for detecting a vehicle speed pulse; an engine speed sensor for detecting an engine speed; first gear position calculator for determining a gear from data from the gear position sensor; second gear position calculator for determining a gear on the basis of data from the vehicle speed pulse sensor and data from the engine speed sensor; and gear position selector for deciding a gear position on the basis of the logical product of the gear position determined by the first gear position calculator and the gear position determined by the second gear position calculator.

5 Claims, 9 Drawing Sheets

FUEL INJECTION CONTROL APPARATUS OF INTERNAL COMBUSTION ENGINE

BACKGROUND OF THE INVENTION

1. Field of the Invention

This invention relates to a fuel injection control apparatus of an internal combustion engine from which driving power is transmitted to an output shaft via a gearbox, and particularly to a fuel injection control apparatus of a type wherein a fuel injection quantity is controlled on the basis of a gear position.

2. Description of the Related Art

In fuel injection control apparatuses of the internal combustion engine of related art, the pressure inside an air-intake pipe and a throttle valve opening have been used as parameters for determining a basic injection quantity of fuel; further to this a gear position of a gearbox has been detected, and the fuel injection quantity has been controlled in correspondence with the gear position at the time to obtain a suitable fuel injection quantity corresponding to the operating state of the engine. As methods for determining this gear position, a method in which a known gear position sensor is used and a method in which the gear position is deduced from the outputs of a vehicle speed pulse sensor and an engine speed sensor are known.

However, because gear position sensors are of a battery voltage resistance voltage-dividing type switched by gear changes, the gear position sensor voltage often fluctuates with fluctuation of the battery voltage and load fluctuation at times of sudden acceleration and so on, and this has been a cause of erroneous determination of the gear position. In particular there has been the problem that in high gears, because the voltage range per gear is narrow, erroneous determinations occur easily. With regard to methods using a vehicle speed pulse sensor and an engine speed sensor, on the other hand, although there are methods of the kind set forth for example in Patent Document 1 (JP-A-2004-100590), in which the gear position is discriminated by the ratio of the engine speed to the vehicle speed being compared with a predetermined reference level of gear ratio, with these there has been the problem that because the gear position is deduced by filtering vehicle speed pulse count information from the vehicle speed pulse sensor, a delay arises in the discrimination of the gear position.

SUMMARY OF THE INVENTION

The present invention was made in view of the kinds of problem discussed above, and it is an object of the invention to provide a fuel injection control apparatus of an internal combustion engine in which, without a gear position sensor being made a high-performance one or a function for suppressing battery voltage fluctuation being added, erroneous determination of gear position and delay of discrimination/updating are ameliorated and gear position accuracy is improved by a conventional gear position sensor being combined with a gear position sensor based on a vehicle speed pulse sensor and an engine speed sensor.

And it is another object of the invention to provide a fuel injection control apparatus of an internal combustion engine with which it is possible to carry out optimal ignition timing control and fuel injection control suited to the current gear.

To achieve these objects, the invention provides a fuel injection control apparatus of an internal combustion engine having: a gear position sensor for detecting a gear position; a vehicle speed pulse sensor for detecting a vehicle speed pulse; an engine speed sensor for detecting an engine speed; first gear position calculating means for determining a gear from data from the gear position sensor; second gear position calculating means for determining a gear on the basis of data from the vehicle speed pulse sensor and data from the engine speed sensor; and gear position selecting means for deciding a gear position in accordance with the logical product of the gear position determined by the first gear position calculating means and the gear position determined by the second gear position calculating means.

With a fuel injection control apparatus of an internal combustion engine according to the invention, without making the gear position sensor a high-performance one or adding a function for suppressing fluctuation of the battery voltage, it is possible to ameliorate gear position updating delay and erroneous determination, and, because even when the gear position sensor has failed the gear can be determined using the vehicle speed pulse sensor and the engine speed sensor, with a system same as at present it is possible to obtain more accurate gear information over a wider range, and even during acceleration or deceleration immediately after a gear change is made, or during travel when the gear position sensor has failed, it is possible to carry out optimal ignition timing control and fuel injection control suited to the present gear, enabling improvement of driveability and reduction of exhaust emissions under these conditions.

DETAILED DESCRIPTION OF THE PREFERRED EMBODIMENTS

First Preferred Embodiment

Figure 1:
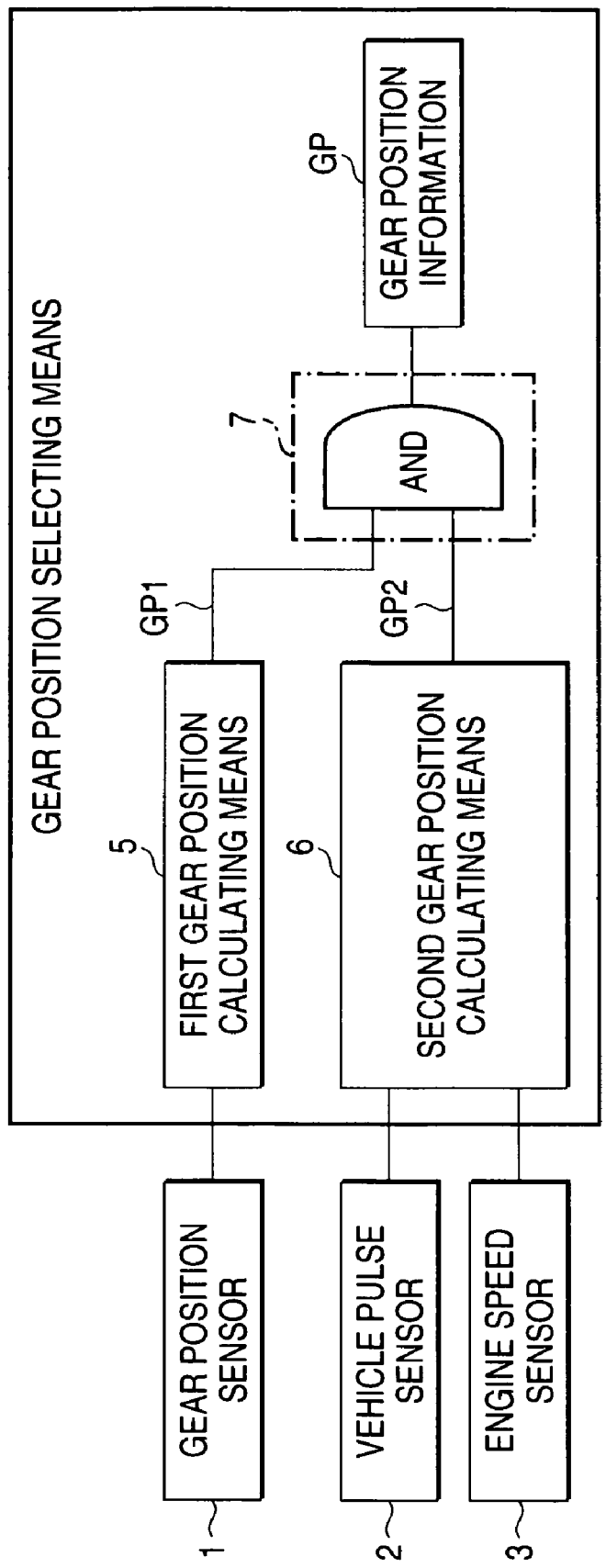
FIG. 1 is a block diagram of gear position determination according to a first preferred embodiment of the present invention.

FIG. 1 is a block diagram of the construction of a fuel injection control apparatus of an internal combustion engine according to a first preferred embodiment of the invention.

In FIG. 1, the reference number 1 denotes a gear position sensor of the above-mentioned conventional battery voltage resistance voltage-dividing type, switched by gear changes. The reference number 2 denotes a vehicle speed pulse sensor mounted on a rotating member such as a gear that rotates in connection with the crankshaft of an engine, and 3 an engine speed sensor detecting for example a crank angle.

The reference number 4 denotes a gear position determination processing part of the fuel injection control apparatus, and this is made up of first gear position calculating means 5 receiving the detection output of the gear position sensor 1, second gear position calculating means 6 receiving the detection outputs of the vehicle speed pulse sensor 2 and the engine speed sensor 3, and gear position selecting means 7 consisting of a logical product circuit (AND). The first gear position calculating means 5 has in a memory table set voltage ranges corresponding to gear positions, and from voltage values between 0 and 5V obtained by the gear position sensor 1 it determines gears sequentially up to a 6th gear, as in for example 0th when the voltage is 3.6 to 4.8V, 1st when it is 2.8 to 3.6V, 2nd when it is 2.2 to 2.8V, and so on.

Figure 2:
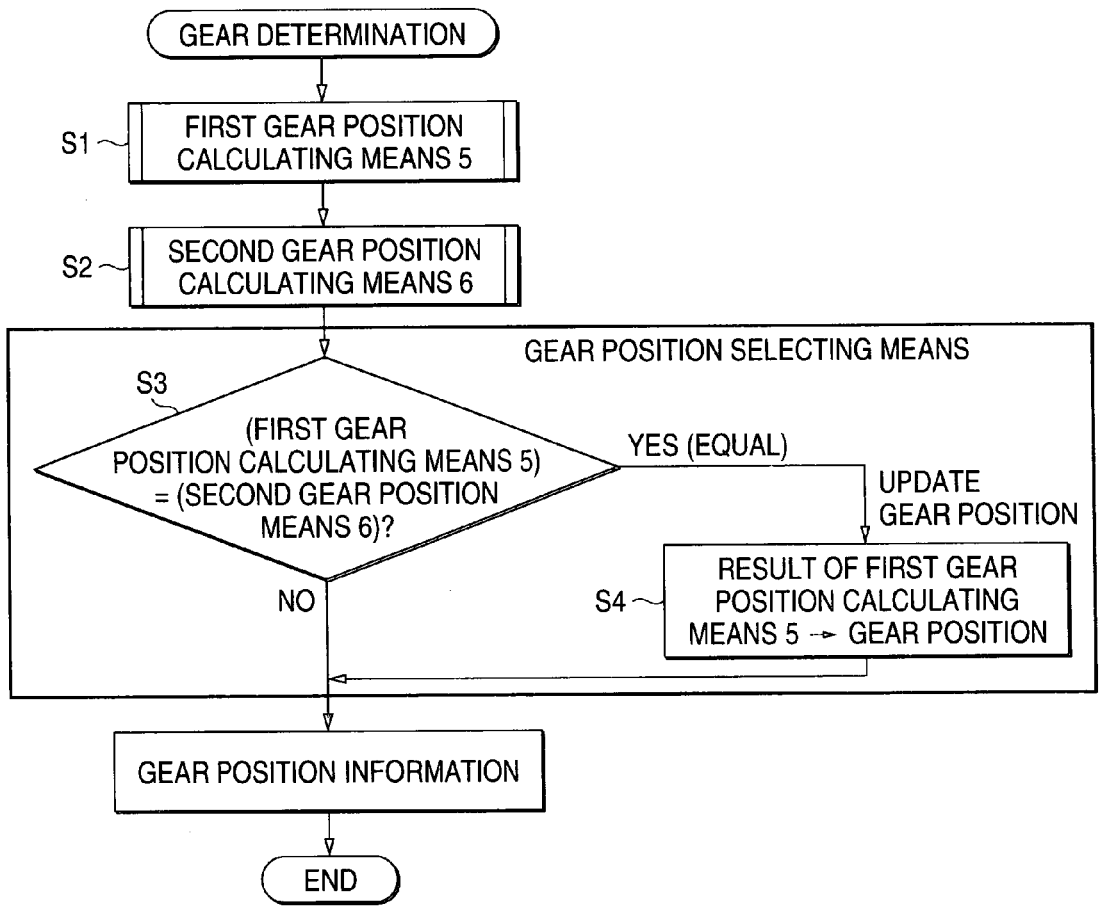
FIG. 2 is a flow chart of the gear position determination in the first preferred embodiment.

FIG. 2 is a gear position determination flow chart of the fuel injection control apparatus shown in FIG. 1. First, gear position sensor data detected by the gear position sensor 1 is operated upon by the first gear position calculating means 5 and a gear position is determined (step S1). In this case, when the preset voltage value range has been kept to for a time preset for the respective gear, for example 500 ms for 0th gear and 50 ms for 1st through 6th gears, it is determined that the gear position has been established and gear position information GP1 is updated.

Figure 3:
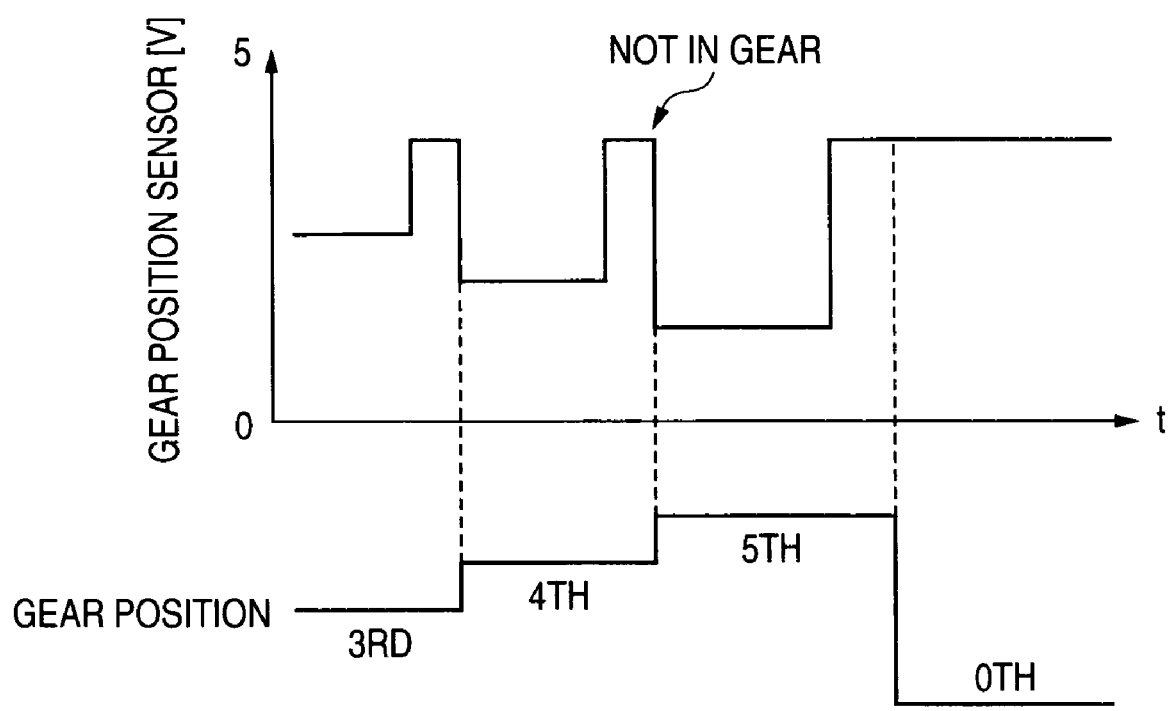
FIG. 3 is a gear position sensor characteristic in the first preferred embodiment.

Here, as shown in FIG. 3, when a gear change is carried out, for example from 3rd gear to 4th gear, a shift-out-gear (not-in-gear) state is momentarily assumed due to the nature of gears, before 4th gear is engaged, and consequently, temporarily, for 100 ms to 300 ms, the gear position sensor detects the determination voltage value of 0th gear. In view of this, for 0th gear only the determination time is set to longer time than this shift-out-gear time, so that when a gear change is made from 3rd gear to 4th gear, 3rd→0th→4th is not detected but rather 3rd→4th is recognized; and for the other gears, 1st through 6th, the determination time is set to a time such that there is no erroneous determination due to noise and the like and such that the determination can be made promptly.

Meanwhile, the vehicle speed pulse count detected by the vehicle speed pulse sensor 2 and the engine speed detected by the engine speed sensor 3 are operated upon by the second gear position calculating means 6 and a gear position is determined (step S2).

That is, from the pulse count obtained from the vehicle speed pulse sensor 2 and a predetermined number of revolutions obtained by the engine speed sensor 3, the number of pulses in one revolution of the engine for example is counted, then a low-pass filter operation is carried out for each revolution. From the result of this computation a gear position is determined on the basis of preset determination values, and gear position information GP2 is updated.

Here, the low-pass filter operation is made the following operation.

$P1 = P1\text{old} + ((P - P\text{old}) \times K1 - P1\text{old})/K2$ $P2 = P2\text{old} + (P1 - P2\text{old})/K2$ P: pulse count this time; Pold: pulse count last time; K1 to K3: filter coefficients; P2: gear position determination value calculated value By this calculation, for example when $P2 \leq 50$, 0th gear is determined; when $50 < P2 \leq 60$, 1st gear; when $60 < P2 \leq 70$, 2nd gear; and so on up to 6th gear.

Data of high stability are set as the filter coefficients K1 to K3 and the determination value for determining the operation result P2, taking into consideration the engine speed and vehicle speed pulse specifications.

And, by the gear position selecting means 7, the gear position information GP1 determined by the first gear position calculating means 5 and the gear position information GP2 determined by the second gear position calculating means 6 are compared (step S3), and when the two match, the gear position information used in the control apparatus is updated, the result of the first gear position calculating means 5 being outputted as a new gear position (step S4); and when they do not match, the gear position information from the previous time is held.

Figure 4:
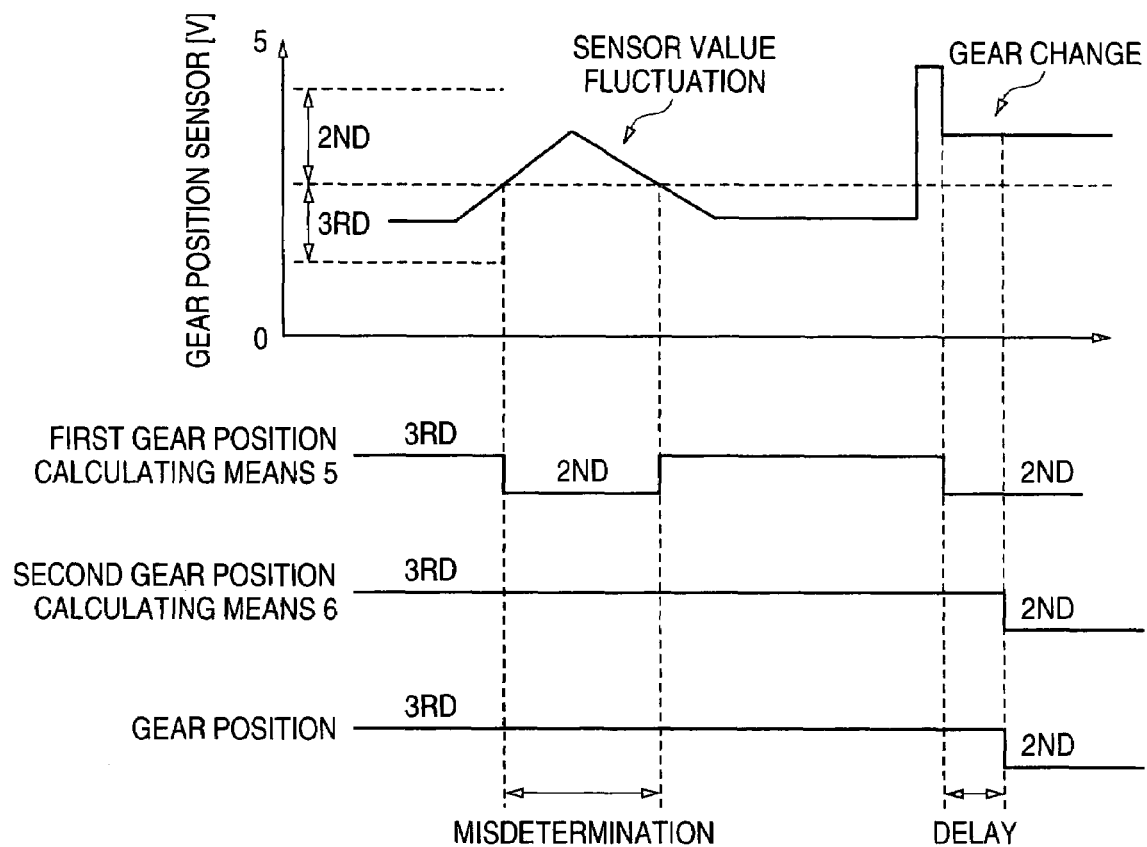
FIG. 4 is a timing chart of gear position determination in the first preferred embodiment.

FIG. 4 shows a timing chart of updating of gear position information in this system. For example when the gear position sensor 1 makes a erroneous determination and the gear position information GP1 from the first gear position calculating means 5 shows a gear position different from the actual gear position (for example 2nd when it is actually 3rd), because the gear position of the second gear position calculating means 6 is unchanged, the gear position information GP is not updated. At the time when a gear change is carried out, the gear position information GP is updated based on gear changes of both the first gear position calculating means 5 and the second gear position calculating means 6.

Figure 5:
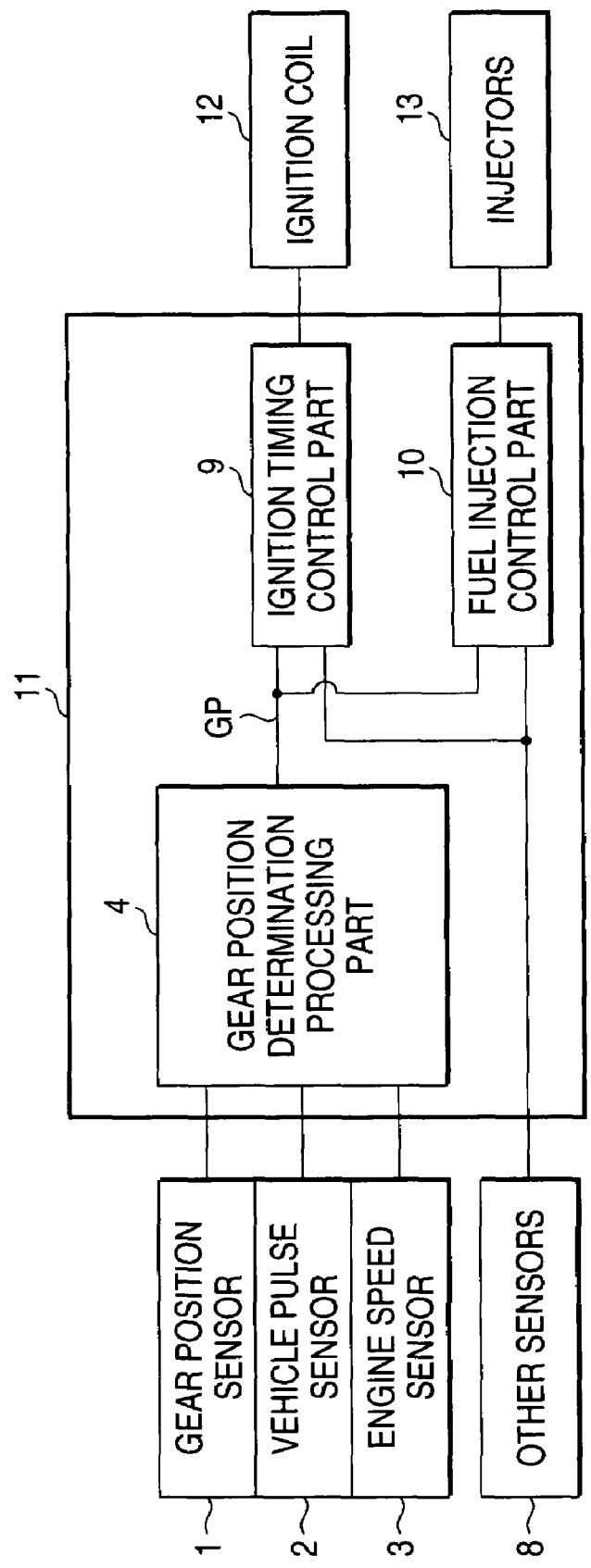
FIG. 5 is a system view of a control apparatus of an internal combustion engine.

FIG. 5 is a system view of a control apparatus of an internal combustion engine. In FIG. 5, on the basis of gear position information GP decided by the system described above and other sensors 8, for example, a water temperature sensor, an intake air temperature sensor and an intake air pressure sensor and the like; an ignition timing control part 9 calculates an optimal ignition timing corresponding to the present conditions and effects ignition processing with an ignition coil 12. And similarly a fuel injection control part 10 calculates an optimal fuel injection quantity and fuel injection timing and effects fuel injection processing via injectors 13. The reference number 11 denotes a control unit of an internal combustion engine made up of the gear position determining part 4 described above, the ignition timing control part 9 and the fuel injection control part 10. By the adoption of this construction, the problem of erroneous determination that the gear position sensor 1 had suffered is resolved.

Second Preferred Embodiment

Figure 6:
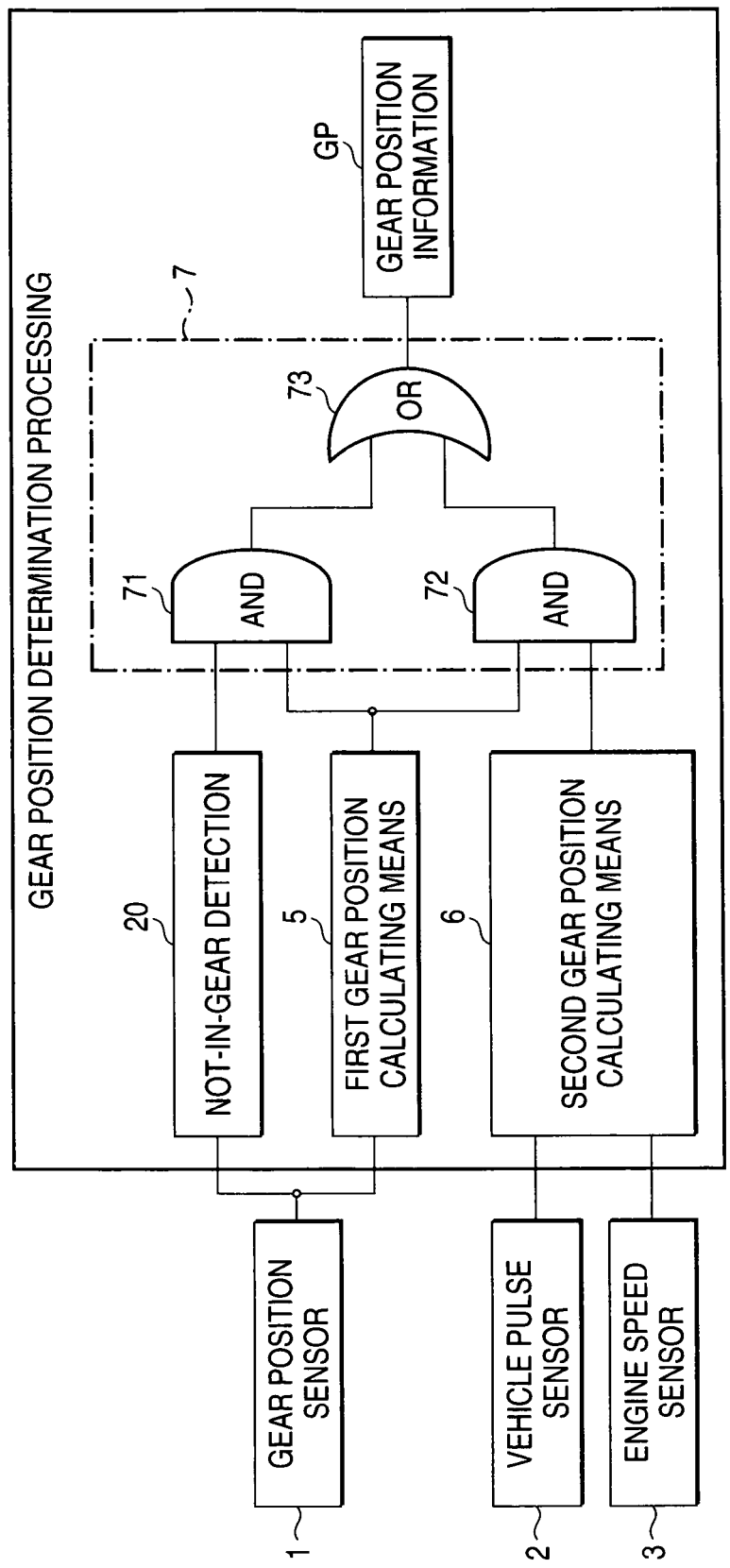
FIG. 6 is a block diagram of gear position determination according to a second preferred embodiment of the invention.

FIG. 6 is a block diagram showing the construction of a fuel injection control apparatus of an internal combustion engine according to a second preferred embodiment of the invention.

In FIG. 6, parts the same as or equivalent to parts in FIG. 1 have been assigned the same reference numbers. The differences from FIG. 1 are that not-in-gear (shift-out-gear) detection means 20 is newly provided and that the gear position selecting means 7 is made up of two logical produce (AND) circuits 71, 72 and a logical sum (OR) circuit 73. That is, a logical product circuit 71 for taking the logical product of the output of the not-in gear (shift-out-gear) detection means 20 and the output of the first gear position calculating means 5 is newly provided, and a logical sum circuit (OR) 73 is provided between the logical product circuit 71 and the logical product circuit 72 for taking the logical product of the output of the first gear position calculating means 5 and the output of the second gear position calculating means 6.

Figure 7:
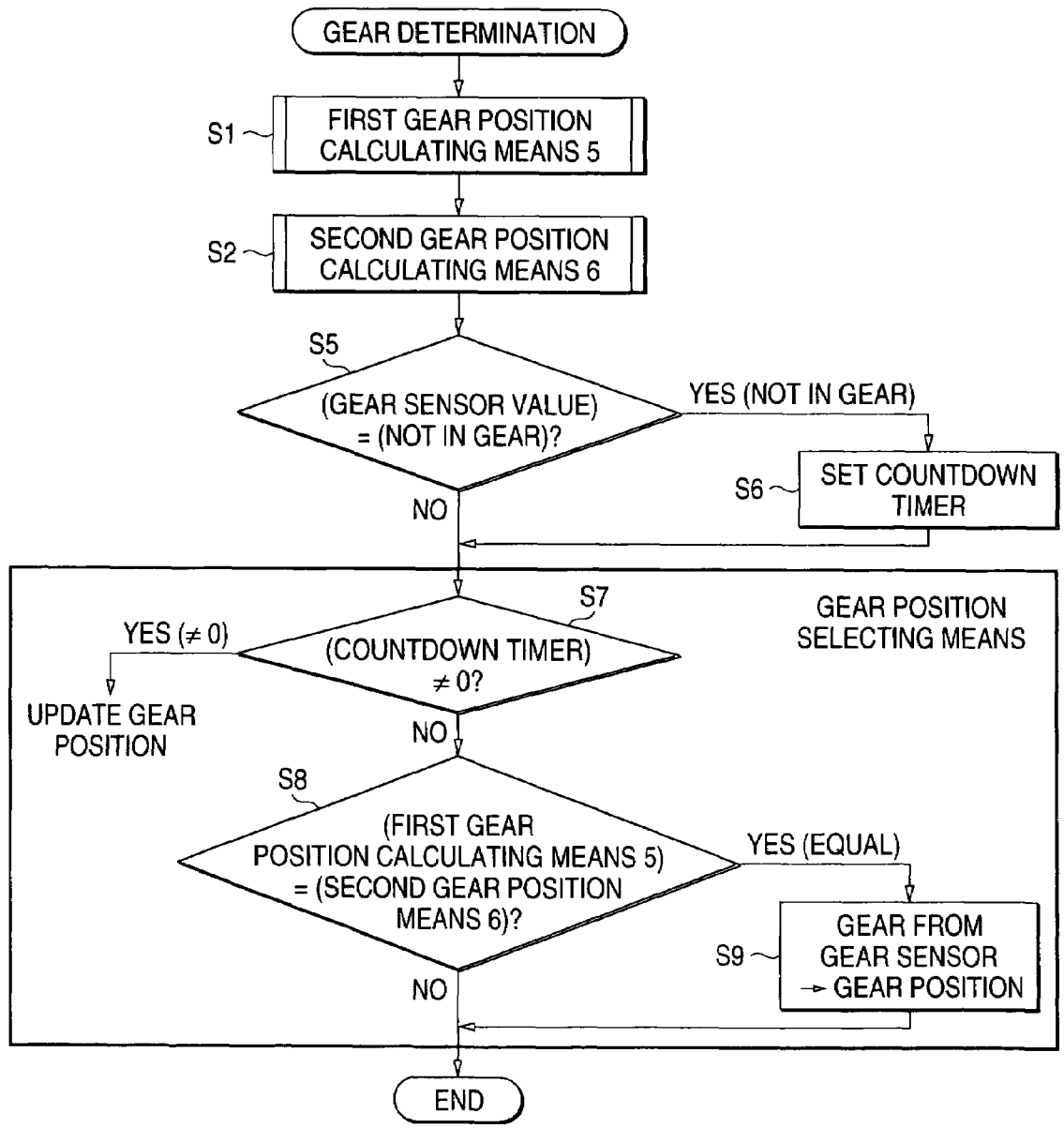
FIG. 7 is a flow chart of gear position determination in the second preferred embodiment.

FIG. 7 is a gear position determination flow chart of the fuel injection control apparatus shown in FIG. 6. In FIG. 7, after the processing of the first gear position calculating means 5 (step S1) and the processing of the second gear position calculating means 6 (step S2) are carried out in the same way as in FIG. 2, if it is determined by the not-in-gear detection means 20 that the gearbox is not-in-gear (step S5), then for a predetermined time from when this not-in-gear determination is made, for example for 500 ms to 1000 ms from when 3.6V to 4.8V is detected, processing is held by a countdown timer (step S6), and for this time the gear position data of the control apparatus is updated with gear position sensor information (step S7). After a fixed time set with the countdown timer elapses, the gear position is updated (step S9) only when the positions determined by the first gear position calculating means 5 and the second gear position calculating means 6 match (step S8).

Figure 8:
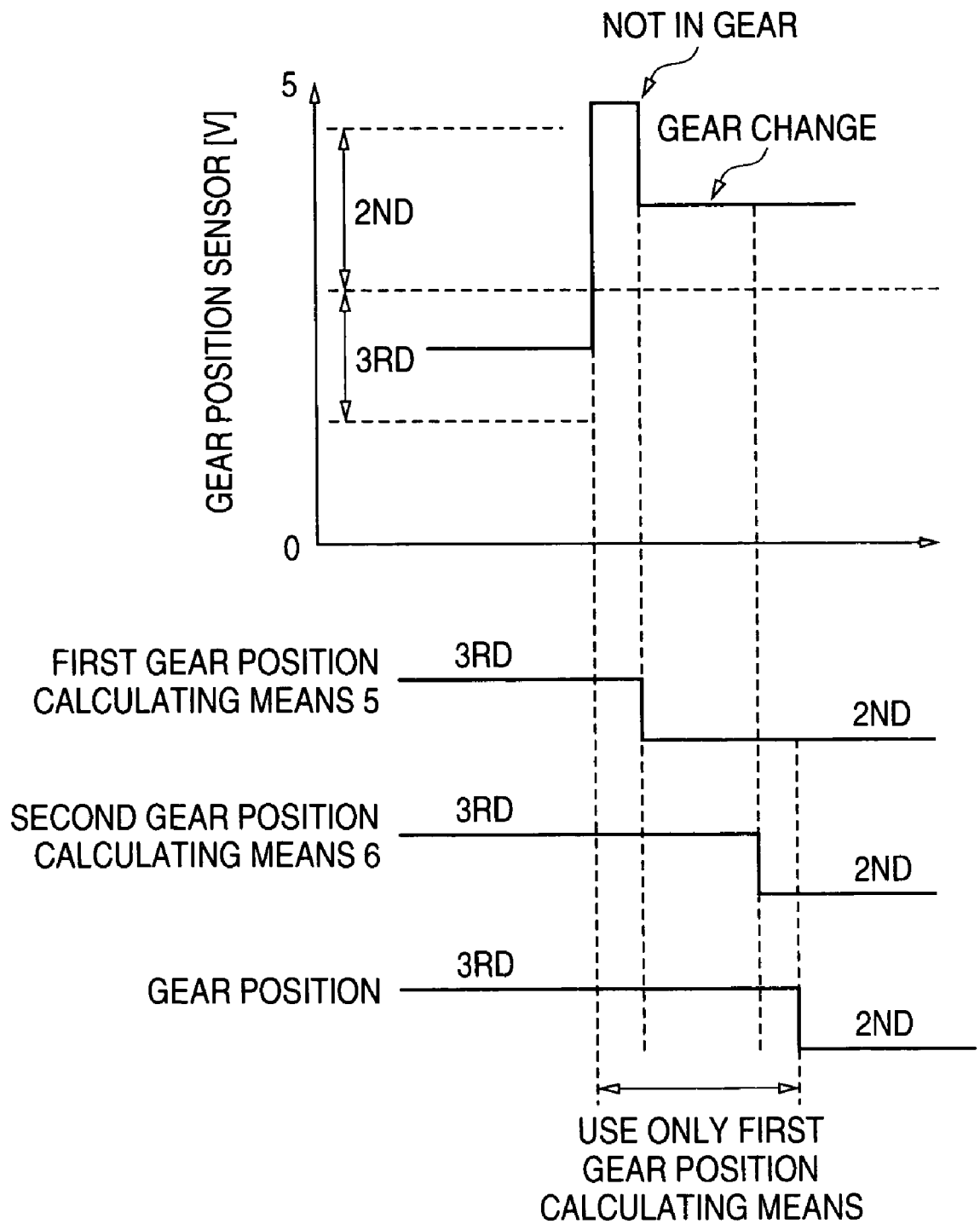
FIG. 8 is a timing chart of gear position determination in the second preferred embodiment.

FIG. 8 is a timing chart of gear position determination, and shows the timing of computation by the gear position sensor 1 and the calculating means 5, 6.

In this second preferred embodiment, when the not-in-gear state has been detected, determination is carried out only with the output information of the first gear position calculating means 5 based on the gear position sensor 1, and after a predetermined time elapses a switch is made back to the determination method of the first preferred embodiment. For example, for 500 ms to 1000 ms from when the 3.6V to 4.8V of 0th gear is detected, the gear position data of the fuel injection control apparatus is updated with the gear position sensor information, and after the predetermined time elapses the gear position is updated only when the determined positions from the first gear position calculating means 5 and the second gear position calculating means 6 match.

This makes use of the characteristic of the gear position sensor 1 that when a gear change is carried out the sensor value momentarily assumes the voltage value of not-in-gear (0th gear), and also makes use of the fact that erroneous determination of the gear position sensor 1 occurs readily in cases where the battery load increases suddenly, such as at a time of sharp acceleration from steady travel, for example at times of sharp acceleration brought about by a sharp throttle opening during steady travel in 5th gear, and because in running states of the kind in which gear changes are carried out battery voltage fluctuations are small and cases of erroneous determination of the gear position sensor occurring are few, for a fixed time from when a gear change is carried out, that is, when a not-in-gear voltage value is detected, the gear position can be determined correctly with the gear position sensor information only.

Third Preferred Embodiment

Figure 9:
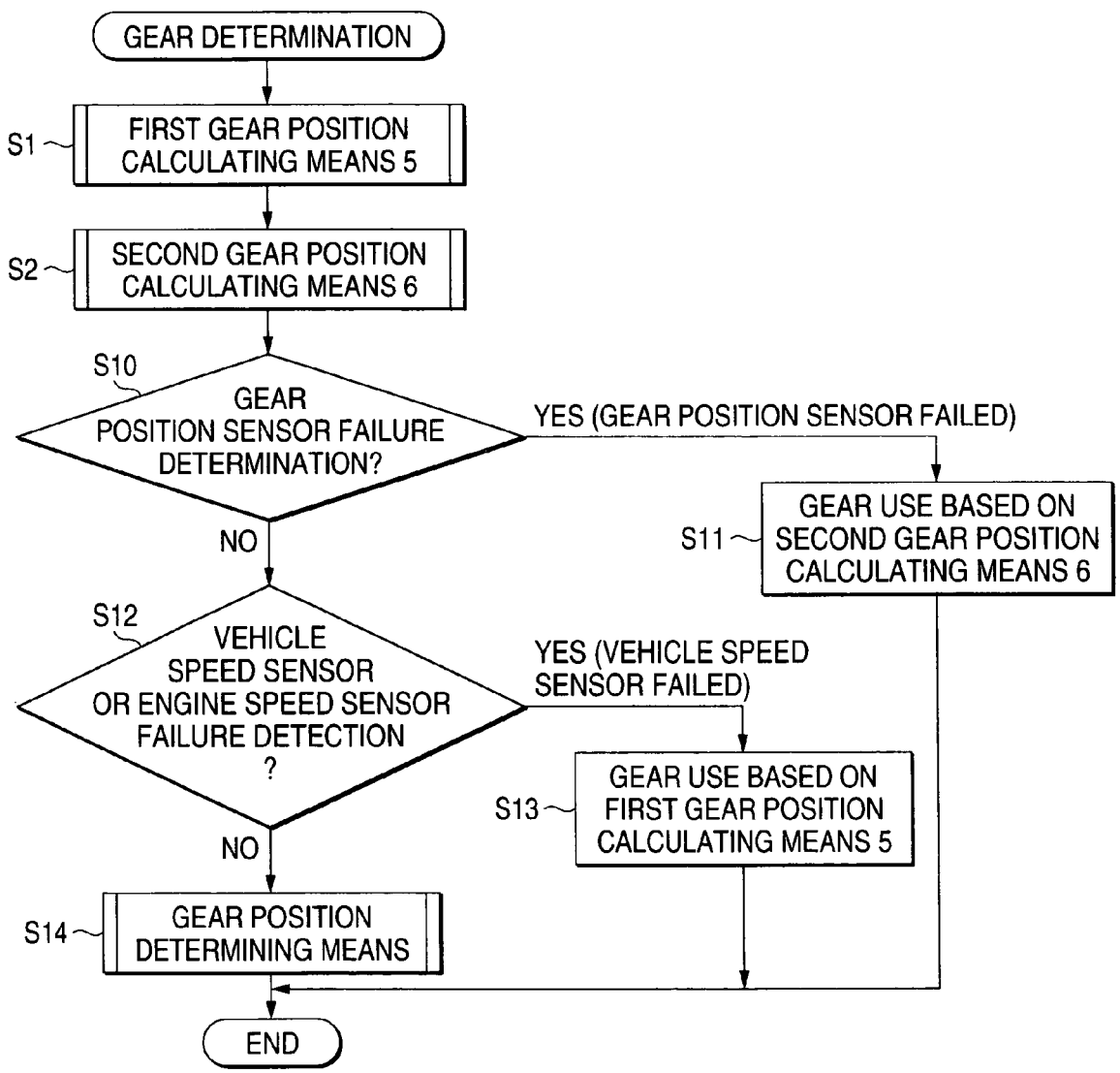
FIG. 9 is a flow chart of gear position determination according to a third preferred embodiment of the invention.

FIG. 9 shows a gear position determination flow chart of a fuel injection control apparatus according to a third preferred embodiment of the invention, in which any abnormality of the gear position sensor 1 or the vehicle speed pulse sensor 2 or the engine speed sensor 3 is detected and means for dealing with such an abnormality are provided.

That is, after the processing of the first gear position calculating means 5 (step S1) and the processing of the second gear position calculating means 6 (step S2) are carried out in the same way as in FIG. 2, when for example the detected voltage of the gear position sensor 1 is above 4.8V or below 2V, which does not occur when the system is normal, it is determined that the gear position sensor has failed (step S10), and only the gear position determined by the calculating means based on the vehicle speed pulse sensor 2 and the engine speed sensor 3, i.e. the second gear position calculating means 6, is employed (step S11).

When on the other hand an abnormality of the vehicle speed pulse sensor 2 or the engine speed sensor 3 is detected (step S12), it is determined that there has been a vehicle speed pulse sensor failure or an engine speed sensor failure, and only the gear position determined by the calculating means using the gear position sensor, i.e. the first gear position calculating means 5, is employed(step S13).

Needless to say, known means of any of various types can be used as the respective abnormality detecting means.

As described above, with this preferred embodiment, by it being made possible for the gear to be determined using the vehicle speed pulse sensor and the engine speed sensor when the gear position sensor has failed, and, conversely, to be determined using the gear position sensor when the vehicle speed pulse sensor or the engine speed sensor has failed, it is possible to obtain more exact gear information over a wider range with a system the same as at present.

What is claimed is:

1. A fuel injection control apparatus of an internal combustion engine, comprising:
    a gear position sensor for detecting a gear position;
    a vehicle speed pulse sensor for detecting a vehicle speed pulse;
    an engine speed sensor for detecting an engine speed;
    first gear position calculating means for determining a gear from data from the gear position sensor;
    second gear position calculating means for determining a gear on the basis of data from the vehicle speed pulse sensor and data from the engine speed sensor; and
    gear position selecting means for deciding a gear position in accordance with the logical product of the gear position determined by the first gear position calculating means and the gear position determined by the second gear position calculating means,
    wherein the first gear position calculating means for determining a gear from data from the gear position sensor updates the gear position when the data from the gear position sensor has remained in a predetermined range for a predetermined time.

2. A fuel injection control apparatus of an internal combustion engine according to claim 1, wherein the second gear position calculating means for determining a gear on the basis of data from the vehicle speed pulse sensor and data from the engine speed sensor updates the gear position by filter processing.

3. A fuel injection control apparatus of an internal combustion engine according to claim 1, further comprising:
    shift-out-gear detection means; and
    gear position selecting means for determining the gear position only with gear data computed by the first gear position calculating means based on the gear position sensor for a fixed period from when the shift-out-gear detection means detects a shift-out-gear state.

4. A fuel injection control apparatus of an internal combustion engine according to claim 1, further comprising failure detecting means for detecting any failure of the gear position sensor, wherein when the failure detecting means detects a failure, the gear position determined by the second gear position calculating means based on the vehicle speed pulse and the engine speed is employed.

5. A fuel injection control apparatus of an internal combustion engine according to claim 1, further comprising either of failure detecting means for detecting any failure of the vehicle speed pulse sensor and failure detecting means for detecting any failure of the engine speed sensor, wherein when a failure is detected by the failure detecting means, the gear position determined by the first gear position calculating means based on the gear position sensor is employed.

* * * * *